United States Patent
Bergström

(10) Patent No.: US 7,304,953 B2
(45) Date of Patent: Dec. 4, 2007

(54) METHOD FOR ORDERING AND TRANSMITTING OF DIGITAL DATA AMOUNTS, PARTICULARLY VIDEO SIGNAL

(75) Inventor: Roger Bergström, Kiruna (SE)

(73) Assignee: IP-Vision AB, Kiruna (SE)

( * ) Notice: Subject to any disclaimer, the term of this patent is extended or adjusted under 35 U.S.C. 154(b) by 965 days.

(21) Appl. No.: 10/220,291

(22) PCT Filed: Mar. 22, 2001

(86) PCT No.: PCT/NO01/00122

§ 371 (c)(1),
(2), (4) Date: Sep. 11, 2002

(87) PCT Pub. No.: WO01/71995

PCT Pub. Date: Sep. 27, 2001

(65) Prior Publication Data

US 2003/0156598 A1    Aug. 21, 2003

(30) Foreign Application Priority Data

Mar. 23, 2000 (NO) .................................. 20001501

(51) Int. Cl.
G08C 15/00 (2006.01)
H04L 12/28 (2006.01)
H04L 12/56 (2006.01)
H04J 3/16 (2006.01)
H04J 3/22 (2006.01)

(52) U.S. Cl. ...................... 370/236; 370/238; 370/412; 370/468

(58) Field of Classification Search ................ 370/236, 370/259, 229, 235, 238, 352, 412, 415, 419–420, 370/464–465, 468, 522; 709/224; 348/14.02
See application file for complete search history.

(56) References Cited

U.S. PATENT DOCUMENTS

| | | | | |
|---|---|---|---|---|
| 5,594,490 A | * | 1/1997 | Dawson et al. | ................ 725/67 |
| 5,650,994 A | * | 7/1997 | Daley | ......................... 370/259 |
| 5,732,078 A | | 3/1998 | Arango | |
| 5,892,754 A | * | 4/1999 | Kompella et al. | ........... 370/236 |
| 6,055,571 A | * | 4/2000 | Fulp et al. | .................. 709/224 |
| 6,115,372 A | | 9/2000 | Dinha | |

* cited by examiner

Primary Examiner—Kevin C. Harper
(74) Attorney, Agent, or Firm—Dennison, Schultz & Macdonald

(57) ABSTRACT

Method for ordering and transmission of digital data, particularly video signals, from a transmitter to a single receiver or a group of receivers where other transmission channels are searched for finding a reasonable alternative. A data signal is sent with a request for transmission of a determined video signal from a receiver to a transmitter. A data packet (I1), being a first part of the signal, is transmitted from the transmitter over a satellite channel. A following part of the signal is transmitted as another data packet (I2) over a narrowband communication channel, such as a low-cost Internet channel. Supervision of the received non-used data amount is carried out in a buffer storage at the receiver. By registering non-used data (buffer amount) at the receiver below a certain level a warning signal will be sent from the receiver to the transmitter. When receiving this warning signal the transmitter initiated transmission to the receiver of a further data packet (I1') of the signal over the satellite channel, for thereafter continuing with transmission of a further signal amount (I2') over the narrowband channel. This alternating transmission will be continued to save transmission capacity over the satellite connection and at the same time to maintain a transmission capacity which results in a satisfying data content in the transmitted signal.

10 Claims, 3 Drawing Sheets

METHOD FOR ORDERING AND TRANSMITTING OF DIGITAL DATA AMOUNTS, PARTICULARLY VIDEO SIGNAL

This application is a filing under 35 USC 371 of PCT/NO01/00122 filed Mar. 22, 2001.

Method for ordering and transmission of digital data, particularly video signals, from a transmitter to a single receiver or a group of receivers.

BACKGROUND OF THE INVENTION

Present terrestrial all-purpose transmission channels used for internet have restricted capacity. At high traffic levels the capacity can approach zero. With today's compression techniques a video signal will ideally require more than 1,5 Mb/s, or at least 500 Kb/s. This means that internet is not suitable for transmission of quality-videosignal, that is to say a video program in real-time.

An alternative is satellite transmission, but this has been too expensive for single real-time transmission of data packets to private users until now. The development of broadband networks with high capacity has not yet reached to the extent that there is a world covering net.

Transmission protocols are known wherein satellite transmission split up data files into packets and add on an identification code and an error identification code to each packet. This can be used to identify errors and to achieve re-transmission of single packets, e.g. as disclosed in U.S. Pat. No. 5,594,490. From this disclosure it is known to carry out re-transmission over internet. Nevertheless this signal architecture is not used to increase the transmission rate up to a real-time transmission.

SUMMARY OF THE INVENTION

The main object of the invention is to provide a method for ordering and transmission of digital signals, particularly video signals, to single users, which has such a high capacity, that the video signal can without quality reduction be transmitted at considerably lower costs than renting a satellite link.

Another object is to create a method which enables a transmitter to make use of free capacity in an existing communication network to attain the lowest possible transmission costs. Alternatively a procedure can be created that enables a user to choose between an immediate transmission, which can have a high proportion of satellite transmission, and an interrupted transmission, which can have a lower portion of satellite transmission.

A further object of the invention is to send signals to a receiver (user) which has asked about transmission of digital signal such as a video film, whether being interested in jointly sending (this signal) with a further digital signal, such as parts of another video recording.

Finally, it is an object to provide a method which allows joint sending of a video signal to an arbitrary number of receivers, wherein the composition of groups of receivers will be coordinated by the transmitter according to the choice of requests from different receivers.

INVENTION

The method according to the invention comprises:

sending a data signal with a request for transmitting of a determined video signal from a receiver to a transmitter, a data packet, being a part of the signal, being transmitted from the transmitter over a channel with particularly high capacity, a following part of the signal being transmitted as another data packet over a narrowband communication channel such as a low-cost internet channel, supervision of the received, non-used data is carried out in a buffer storage at the receiver, registration of non-used data amount (buffer amount) below a certain level at the receiver and sending a warning signal from the receiver to the transmitter, upon receipt of this warning signal the transmitter initiates transmission to the receiver of a further data packet of the signal over the channel with high capacity, and thereafter to continue with transmission of a further signal amount over the narrowband channel, and that this alternating transmission continues to save transmission capacity over the broadband connection and at the same time to maintain a transmission capacity which results in a satisfying data content in the transmitted signal.

With this method it is possible to attain sufficient transmission capacity without a considerable increase of transmission costs in relation to usual internet transmission and considerable reduction of costs in relation to satellite transmission respectively. The use of satellite transmission is being restricted to short intervals. With a satellite capacity of about 48 Mb/s one can get down to a share of satellite transmission of 10-20% of the overall transmission time. theoretical considerably lower.

This is particularly important with single transmissions, where a data packet has to be transmitted to a single receiver as it is in the case of transmission of a video program "on demand".

Finally it is an object to create a method which allows such a joint sending of a video signal to an arbitrary number of receiver, whereas the composition of groups of receivers will be coordinated at the transmitter according to the choice of requests from different receivers.

Further details of the invention will arise from the description of an example below.

BRIEF DESCRIPTION OF THE DRAWINGS

The invention is further described below with reference to the drawings, wherein:

FIGS. 2A and 2B show a flowchart which illustrate transmission of data from a transmitter to a receiver over different communication lines corresponding with an embodiment of the invention, while

DESCRIPTION OF THE PREFERRED EMBODIMENTS

Figure 1:
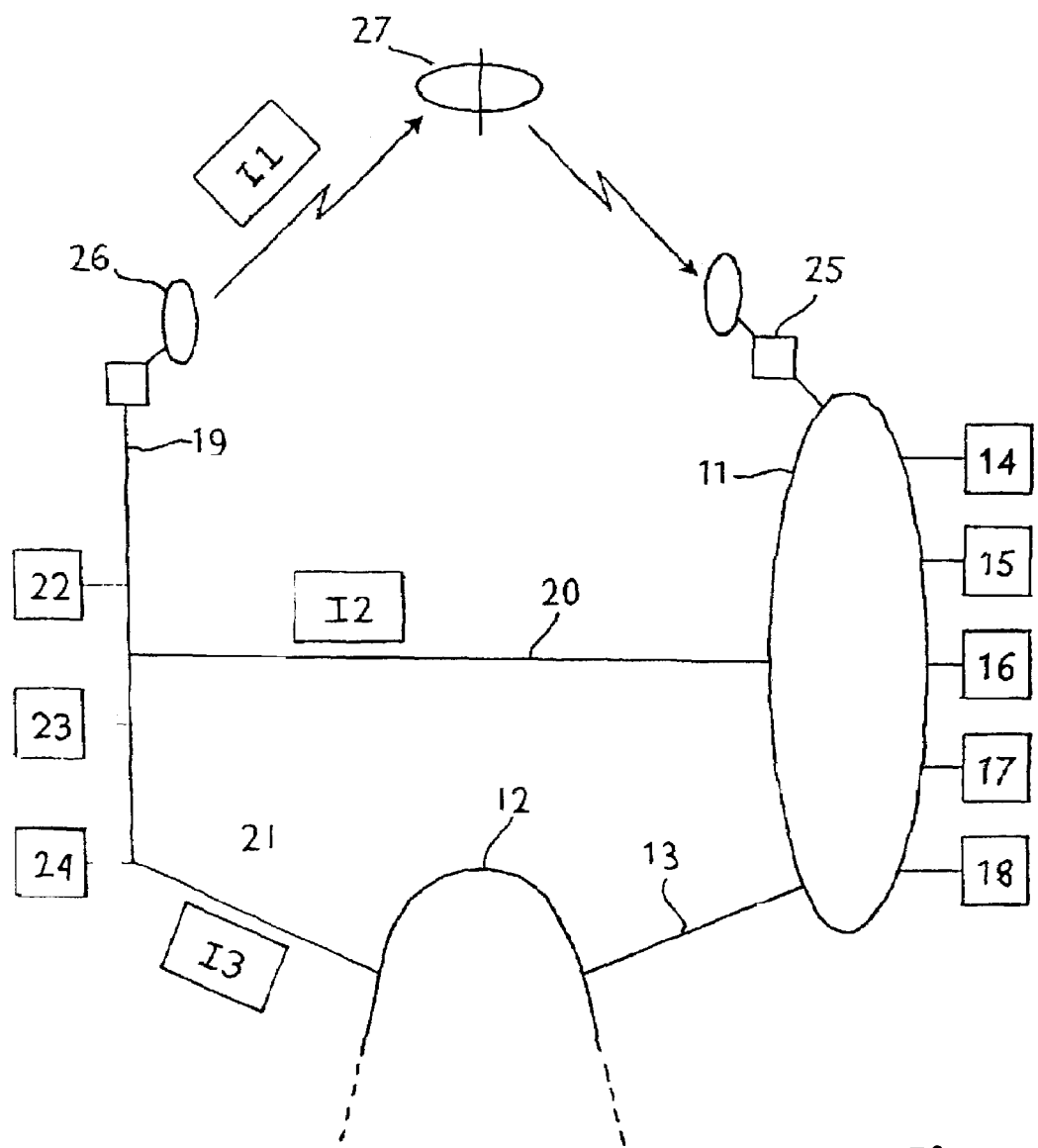
FIG. 1 schematically shows an example of a network of transmitters or data suppliers and receivers which are connected with each other over different communication channels by connection of groups of receivers within two broadband networks.

Referring to FIG. 1, two broadband networks 11 and 12 are connected with a narrowband internet line 13. The network 11 is shown with a number of receivers connected with users or subscribers which are marked with reference numbers 14-18. The receivers 14-18 can be data machines which are connected to the broadband network 11 by modem or another receiving unit with suitable data power, which is able to communicate with the broadband network correspondingly. The receivers 14-18 practically will be receivers of data files, which can search, find and download these files from an arbitrary place in an extensive network. Practically this means internet or "world wide web".

The two broadband networks 11 and 12 are also connected with a further broadband network 19 over respective internet lines 20 and 21. Connected to the third broadband network 19 are a number of data suppliers or transmitters 22-24. Each of the two broadband networks 11 and 19 are also connected tpo satellite transmitter/receiver 25, 26, which can be connected with a satellite 27.

The terms "receiver" and "data supplier/transmitter" and their use are chosen for illustrating a given configuration. In practice many of such broadband networks can be found where "receivers" and "data suppliers" are distributed among each other in the different networks. In cases where a receiver and a transmitter are located in the same broadband network the disadvantage that forms the basis of the invention will not exist. But in the foreseeable future and on a global scale there will be a growing number of considerable broadband networks which communicate with the present internet. It also should be noted that in some cases the same unit can be alternatively user or data supplier. In the following description it is assumed that in a situation of normal use there are dedicated data suppliers and that receivers exclusively demand data files. In the most ordinary cases of use the data supplier will be a unit which offers video programs "on demand".

Each data supplier comprises a transmission server of known design. The transmission of data files from a data supplier takes place with a file transmission protocol (FTP—"File Transfer Protocol"), for example TCP/IP ("Transmission Control Protocol/Internet Protocol") or UDP/IP ("User Datagram Protocol/Internet Protocol"), designed for transmission of data between separate data machines or servers.

Thus an example of a current data transmission is transmission of a video program which is located at a data supplier by way of a stored data file which can be transmitted as a signal for presentation at a receiver in real-time. In this case the receiver will send a signal over internet with instruction for transmission, which will be received at the data supplier.

Figure 2A:
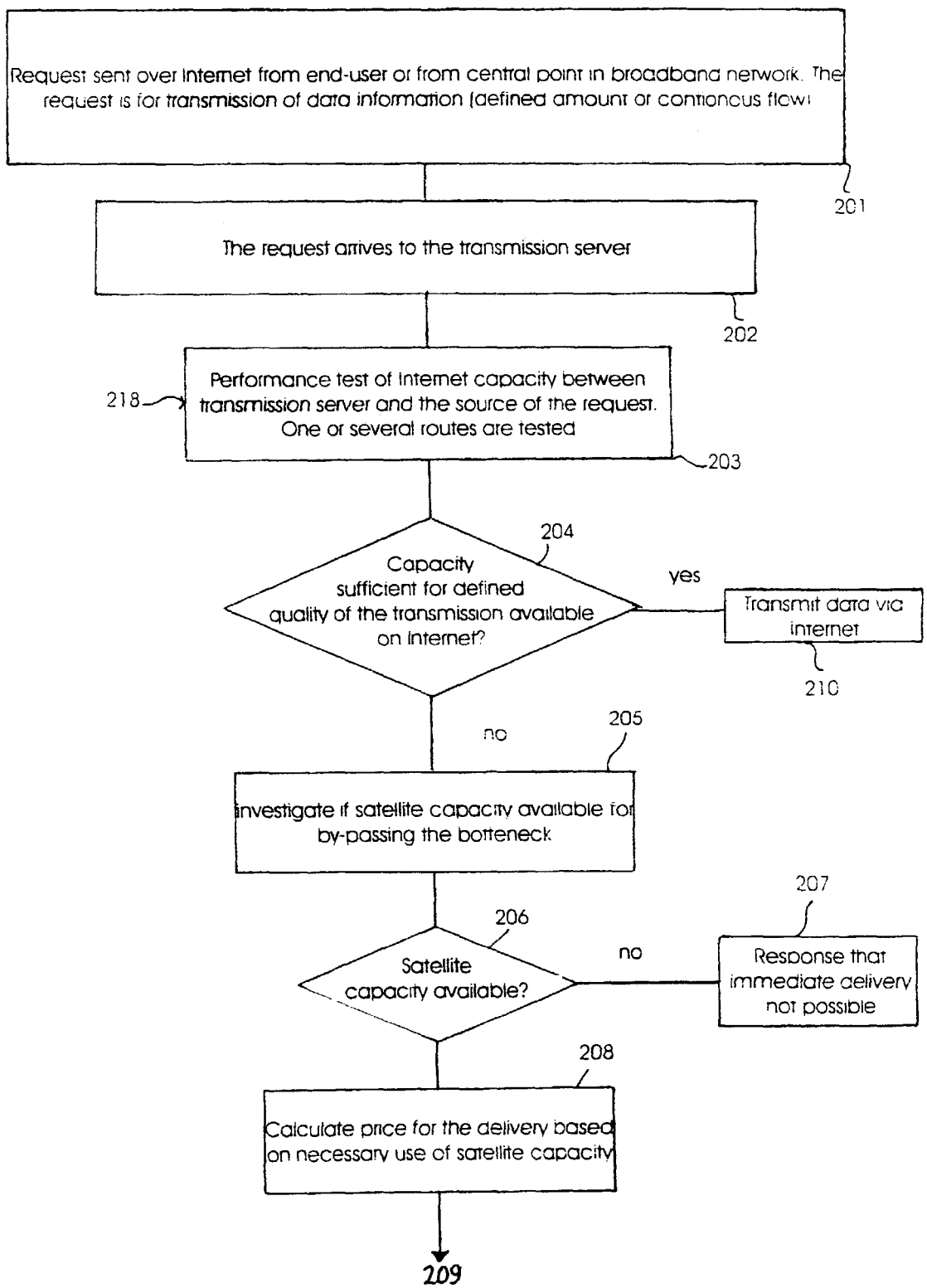
Figure 2B:
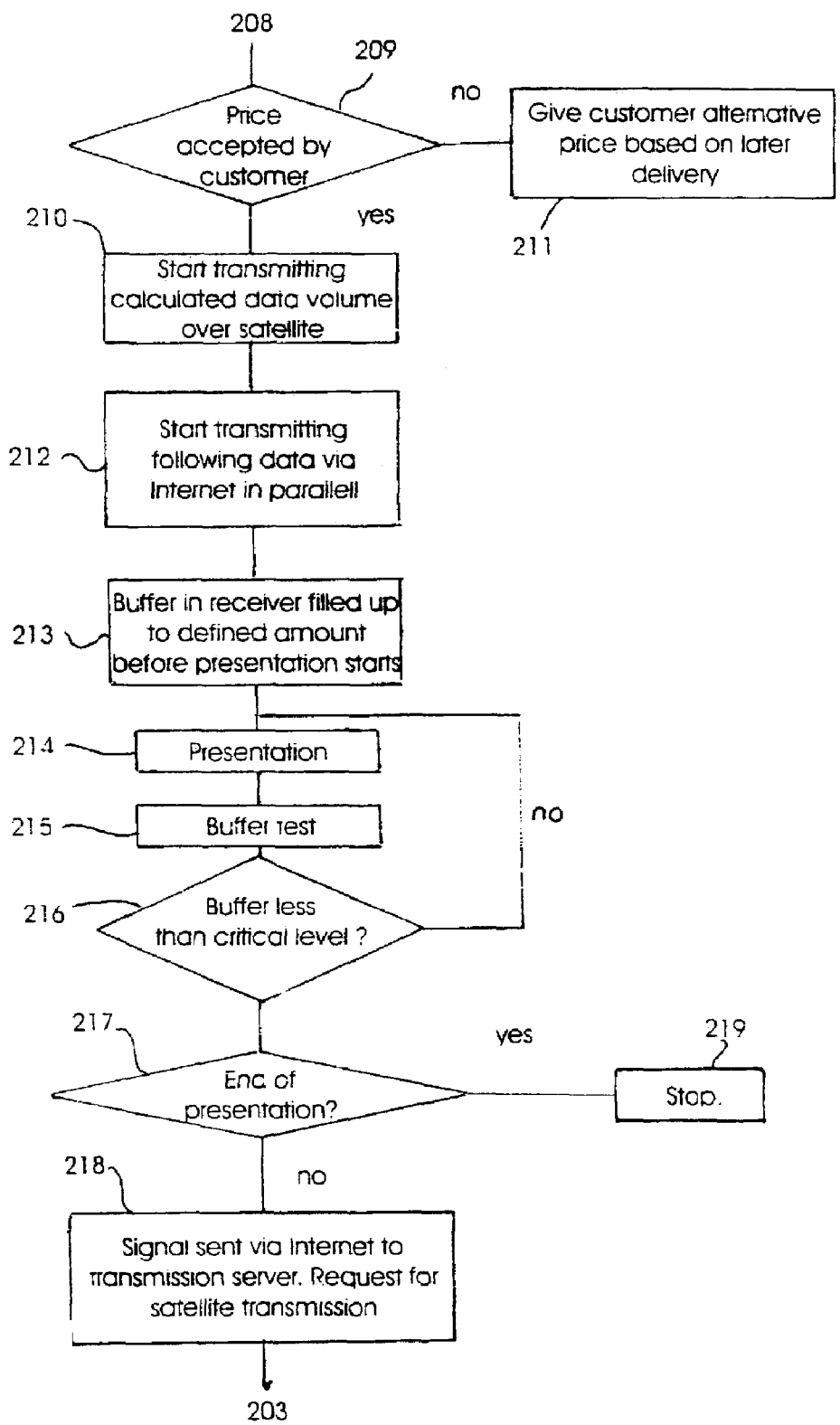

FIGS. 2A and 2B show a flowchart which illustrates the principle of carrying out the method according to the invention. At the first step 201 a receiver sends a request over internet, for example from receiver 14 over line 20 to the data supplier 22, for transmission of a certain data file, either a certain packet which has to be transmitted in an even stream or a continuous signal with unlimited duration.

At step 202 this request is received at the data supplier which is a server for data transmission. Then at step 203 the server 22 will test the transmission capacity of different routes. This can take place by using known technology. If at step 204 it is found that the capacity in one or more routes through low-cost internet are sufficient for the current object of transmission, the transmission of a first data packet starts over a first route, for example over line 20. The continuation of this way of transmission will arise from the following description.

If a sufficient low-cost internet capacity is not found at step 205 it will be investigated whether there is free satellite capacity to avoid the bottleneck. If at step 206 it is ascertained that such capacity is not found as well, then at step 207 a signal is sent to advise that for the time being no transmission can take place. If free capacity is found, then at step 208 a charge will be calculated for a combined satellite-line-transmission based on a relationship between use of satellite and low-cost internet defined according to experience and statistics. If customers, (meaning those who operate the receiver 14), accept the charge at step 209 the transmission of the requested data amount can be started over a satellite connection at step 210. If the charge is not accepted the customer will be given an alternative charge for later delivery at step 211.

The start of the transmission means that a defined data packet I1 (FIG. 3) with its identifying mark is being sent over satellite transmitter 26 and satellite 27, for being received by the receiver 14. The magnitude of this data packet can be defined at the transmitter on the basis of the information concerning the current capacity of the internet which can be found out by the transmitter. This can occur with the aid of suitable software.

At the same time transmission of another, following data packet I2 will be started over a low-cost internet line 20. Thereafter at step 212 transmission of a third data packet I3 will be started which follows the other over internet line 21 and 13. The data packet I1 will be picked up from satellite receiver 25. All of the data packets I1, I2 and I3 are fed to the receiver 14 over the broadband network 11.

All data packets are collected in a storage buffer, in the following simply called buffer. The receiver 14 is, in a corresponding way like other receivers which are interested in carrying out this kind of transmission, provided with software which at step 213 ascertains when the data content in the buffer is sufficient based on a data content defined in advance to start presentation at step 214.

Figure 3:
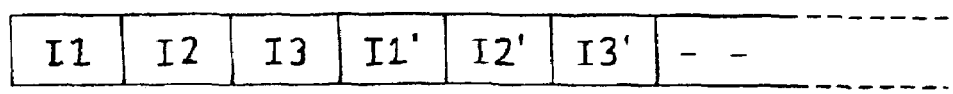
FIG. 3 shows how the signal sequence from a transmitter can be split up into packets for distribution among unequal channels.

At step 215 the software will test the buffer level. If at step 216 it is ascertained that the buffer content is below a critical level it will be made clear at step 217 that the presentation can be finished at step 219 or that there is need for more data. At step 218 a signal will be sent via internet to data supplier 22, so that step 203 is taken up again. In FIG. 3 this is shown with data packets I1',I2' and I3'.

For carrying out this method it is necessary that each receiver has a program installed which is able to set up a buffer segment in the memory which can react on codes in the program packet so that they can be tied together after transmission through different communication channels and which can supervise the information content in the buffer and send an announcement to the data supplier for starting of new transmission at step 203 (FIG. 3). Such a program will be based on the standardized and arranged protocols for transmission of data packets and can be executed by using known programming routines.

In a modified embodiment the transmitter can have an alternative step 208 (not shown), wherein it offers the possibility to a receiver for reduced costs by allowing it to be sent further information within the same transmission, for example customer information or campaign information from public authorities or commercial information as a part of marketing or news without relation to the data which is actually being ordered. Such information will in this case be included into the main signal in short sequences.

In a further modified embodiment the transmitter can contain software for the coordination of requests and orders from a number of receivers, so that there can be set up collective transmission with reduced transmission costs at an arranged time.

The invention described above is based on a certain preferred embodiment. This can be realized with only one internet channel or with more than two such channels. A theoretical alternative to satellite connection is connection over radio link, but this is of no practical importance. An alternative to the use of satellite connection could be another future high-cost broadband connection.

It is possible to give users the option between a commercial-free transmission and a transmission with commercials—or with an information content which is paid for by a third party and which in this way may reduce the expenses for the user. Such commercial announcements can be laid down offline locally in the network and arranged for downloading without stressing the transmission capacity. For example a number of announcements can be stored at several, arbitrary places in the network, ready for download, without extra transmission costs. In this way commercials can be transmitted within periods of low capacity in the network, and which will be interrupted when the capacity is no longer satisfied.

The commercial interlude can either be open to the public or adapted to the profile of interests of the user based on formerly gathered information concerning the user. Such commercial interludes either can be transmitted to the user in real-time or be saved locally on the network or on the user's equipment It is possible to start transmission with commercial content which is downloaded from a local server. As a result no high capacity transmission is necessary.

It is also possible, with the starting point of a usual buffer storage size, to extend the buffer storage size for one period, if there is an abundance of free transmission capacity.

It is also possible to give users the option between an immediate transfer of a transmission at a certain price and a delayed transfer at a lower price and with reasonable use of the capacity of the network.

Also the users can be given an option between different transmission qualities, especially between a low-quality, rapid transmission at a relatively low price and a high quality transmission at a higher price.

The invention claimed is:

1. Method for ordering and transmission of video signals from a transmitter to a single receiver or a group of receivers in which several transmission channels are searched to locate alternatives by choosing between unequal connection lines based on criteria for capacity and cost, comprising the steps of:

sending from a receiver to a transmitter, a data signal with a request for transmission of a predetermined video signal, transmitting from the transmitter to the receiver a data packet which is a part of the predetermined video signal, over a channel with high capacity, transmitting another data packet which is a following part of the predetermined video signal from the transmitter to the receiver over a lower capacity communication channel, supervising received and non-used data in a buffer storage at the receiver, registering non-used data below a predetermined level in the buffer storage, and sending thereby a warning signal from the receiver to the transmitter, at receipt of said warning signal, causing the transmitter to initiate transmission to the receiver of a further data packet of the signal over the channel with high capacity, and thereafter continuing with transmission of further data packets over the lower capacity channel, thereby alternating transmission between the high capacity channel and the lower capacity channel, to save transmission capacity over the high capacity channel, while maintaining a transmission capacity which results in a sufficient data content in the transmitted signal.

2. Method according to claim 1, wherein the channel with high capacity is a satellite connection.

3. Method according to claim 1, wherein signals from the high and lower capacity channels are coordinated with a data program for synchronous re-setting up of an output signal.

4. Method according to claim 1, wherein the first data packet which is transmitted over the channel with high capacity is a starting data amount.

5. Method according to claim 1, wherein the data packet which is transmitted over the lower capacity channel is distributed among two or more branches by transmitting a first part over a first branch and transmitting another part over another branch.

6. Method according to claim 1, wherein the transmitter contains algorithms, statistics and analyzing methods for determining availability and costs for alternative transmission channels and for communicating explanations about costs to the receiver before starting of transmission to provide a possibility for options to the receiver.

7. Method according to claim 1, further comprising transmitting a signal to the receiver with an option for transmission of data signals together with one or more further data packets, including from a third party.

8. Method according to claim 1, wherein the transmitter carries out a coordination of two or more signals with a request for receiving of a video program, so that there is created a collective transmission to two or more receivers, after having received a confirmation signal from two receivers.

9. Method according to claim 8, including transmission of a signal which contains offers for transmission of a video program at a certain time.

10. Method according to claim 1, wherein the lower capacity channel is an internet channel.

* * * * *